United States Patent
Siracusa

(10) Patent No.: US 10,288,900 B2
(45) Date of Patent: May 14, 2019

(54) FLEXIBLE TEMPLES FOR GLASSES FRAMES

(71) Applicant: Summer Hawk Optics, Inc., Austin, TX (US)

(72) Inventor: Dean Siracusa, Austin, TX (US)

(73) Assignee: Summer Hawk Optics, Inc., Austin, TX (US)

( * ) Notice: Subject to any disclaimer, the term of this patent is extended or adjusted under 35 U.S.C. 154(b) by 41 days.

(21) Appl. No.: 15/644,218

(22) Filed: Jul. 7, 2017

(65) Prior Publication Data

US 2018/0011339 A1 Jan. 11, 2018

Related U.S. Application Data

(60) Provisional application No. 62/359,406, filed on Jul. 7, 2016.

(51) Int. Cl.
*G02C 5/16* (2006.01)
*G02C 5/22* (2006.01)

(52) U.S. Cl.
CPC ............. *G02C 5/16* (2013.01); *G02C 5/22* (2013.01)

(58) Field of Classification Search
CPC ........ G02C 5/14; G02C 5/22; G02C 2200/16; G02C 5/16; G02C 5/2254

USPC ............................. 351/111, 113, 114
See application file for complete search history.

(56) References Cited

U.S. PATENT DOCUMENTS

| 4,925,291 | A | 5/1990 | Anger et al. | |
| 7,044,596 | B2 * | 5/2006 | Park | G02C 1/02 16/228 |
| 8,454,155 | B1 * | 6/2013 | Ho | G02C 5/06 351/114 |
| 2015/0226979 | A1 | 8/2015 | Lundh | |
| 2016/0054584 | A1 | 2/2016 | Cabre Ozores | |

OTHER PUBLICATIONS

Flying Eyes Sunglasses, "Flying Eyes Sunglasses on Kickstarter," youtube (Nov. 22, 2015) 1, 8-20 [retrieved on Aug. 21, 2017]. Retrieved from the Internet: <URL:https://www.youtube.com/watch?v=37up8J6gJ5c> entire video.
PCT/US2017/041164 International Search Report and Written Opinion of the International Searching Authority dated Sep. 14, 2017 (9 pages).

* cited by examiner

*Primary Examiner* — Hung X Dang
(74) *Attorney, Agent, or Firm* — Lee & Hayes, P.C.

(57) ABSTRACT

Glasses frames including temples that may be worn comfortably beneath a head gear, such as helmets, headsets, earmuffs, hard hats, and speakers. In some cases, the temples may be thin, substantially flat, and flexible to allow the temples to deform without substantially increasing the pressure applied by the head gear to a head of a wearer.

20 Claims, 12 Drawing Sheets

FLEXIBLE TEMPLES FOR GLASSES FRAMES

CROSS-REFERENCE TO RELATED APPLICATION(S)

This application claims priority to U.S. Provisional Application No. 62/359,406 filed on Jul. 7, 2016 and entitled "FLEXIBLE TEMPLES FOR GLASSES FRAMES", which is incorporated herein by reference in its entirety.

BACKGROUND

Glasses frames are conventionally made of rigid plastic and metal. In some situations, the rigid plastic and metal dig into or apply pressure uncomfortably to a head of a user wearing the glasses. Unfortunately, the uncomfortable pressure experienced by a user is typically increased when the user places headbands, over-the-head headphones, earmuffs, headsets, hard hats, helmets, or goggles over the frames. Typically, the conventional rigid frames bend out of shape in these situations permanently altering the fit of the frames and deforming the angle and distance of lenses from the eyes resulting, in some cases, in suboptimal vision correction. Problems associated with discomfort and deformation of frames often negatively impact the wearer, and may cause skin irritation, headaches, and increased strain on the eyes.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items.

DETAILED DESCRIPTION

Figure 1:
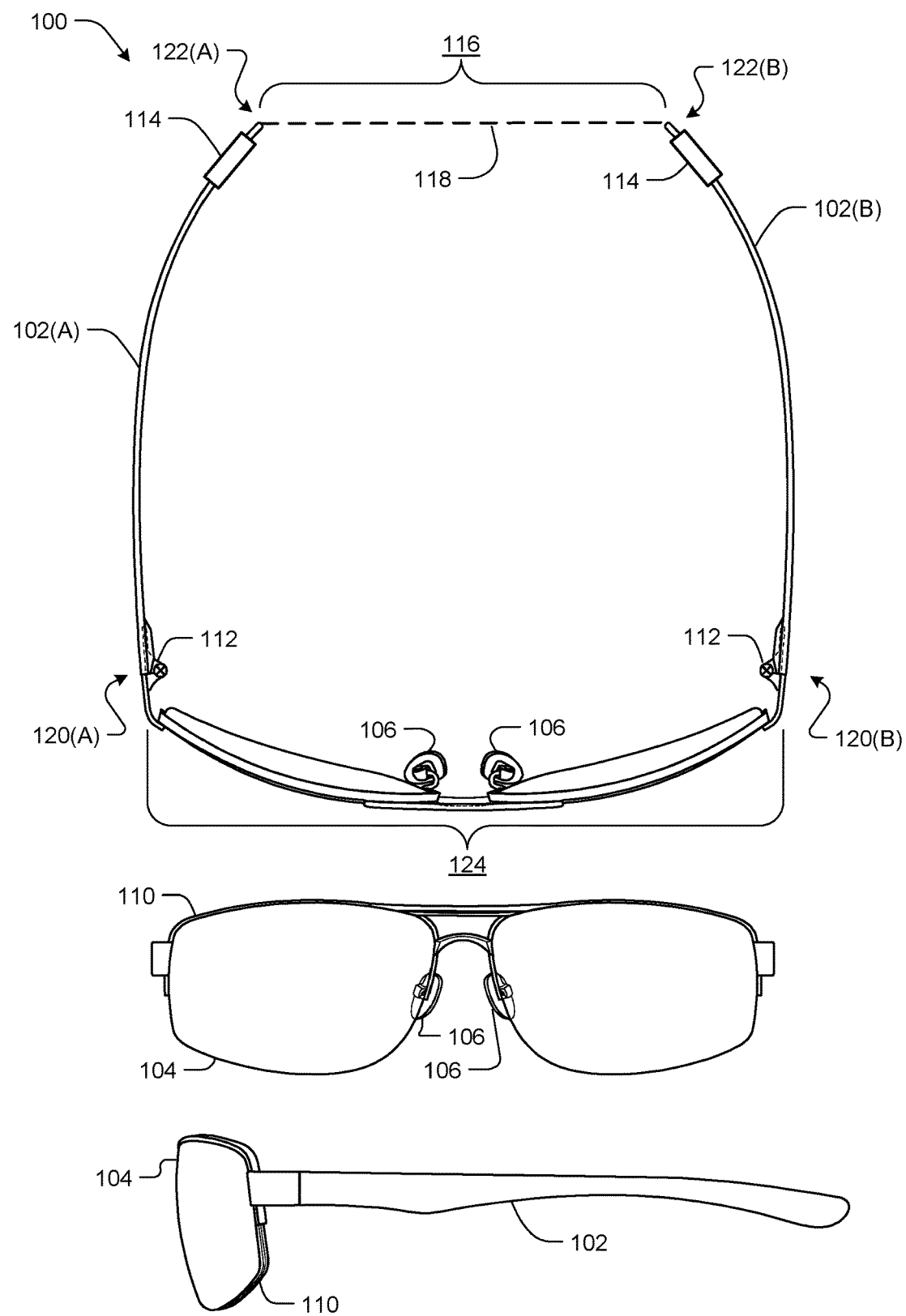
FIG. 1 illustrates a front view, top view, and a side view of an example set of glasses frames according to some implementations.

Described herein are implementations and techniques related to providing flexible glasses frames configured to be worn comfortably under a helmet, hat, headsets, or other types of head gear. For example, one issue with traditional sunglass frames is that the temples of the glasses are uncomfortable to wear in conjunction with headsets, hats, helmets, and other types of head gear. For example, pilots often wear glasses with temples that extend between and rest on the user's head/ears and an aviation headset. Due to noise generated by the airplanes (e.g., engine noise, rotary noise, and environmental noises), the aviation headsets often include compression based noise cancelation in lieu and/or in addition to digital noise cancellation to allow the pilot to hear, for instance, a tower controller via the headsets. Often the pressure exerted by the headsets, including compression based noise cancelation, is often extreme to the point of discomfort. Any discomfort associated with the pressure or force applied to the side of the user's head is only increased when glasses are worn under the headset as the pressure becomes localized along the temples of the frame. In many cases, the pilots often prefer to wear the sunglasses to improve visibility and safety when operating an aircraft. Further, in some cases, the glasses may be deformed further increasing the discomfort experienced by the user and, in some situations, permanently deforming the frames.

In one implementation described herein, the temples of the frames may be formed from a thin (e.g., less than 1.5 mm, less than 1.0 mm, or less than 0.8 mm) and tall (e.g., between 10 mm and 6 mm) layer of polyetherimide which allows the temples to deform without breaking or becoming permanently misshapen. In some cases, the relative height of the temples along a user's head may also be increased to further spread the pressure caused by head wear over a greater area of the user's head, thus further reducing any discomfort. Additionally, since the temples are thin, wide, and flexible, the temples may deform in response to compression or pressure, such as the pressure being applied by the compression headsets of the pilots, in a manner that reduces or minimizes discomfort. For instance, the temples may be thin and wide enough to fit between the wearer's head and any headgear without applying additional pressure to the pressure applied by the headgear on the wearer's ear or head that traditionally cause discomfort, skin irritation, and/or headaches.

In some examples, the temples of the frames may be formed from a material that has a tensile stress at approximately 5.0 mm/min of approximately 1120 kgf/cm$^2$, a tensile strain yield of 7%, and a tensile strain break at 60%. In some cases, the material of the temples may have a tensile modulus at approximately 5.0 mm/min of approximately 36,500 kgf/cm$^2$. In some cases, the material selected to from the temples may have a flexural stress yield at approximately 2.6 mm/min, 100 mm span of 1,680 kgf/cm$^2$ and a flexural modulus of 109. In one particular example, the taber abrasion of the material at CS-17, 1 kg may be approximately 10 mg/1000 cycles. In other cases, the izod impact unnotched at 23° C. is approximately 136 cm-kgf/cm for the material of the temples. In some specific examples, the material of the temples may have a specific gravity of approximately 1.27, a water absorption over a 24 hour period of 0.25%, mold shrinkage, flow at 3.2 mm of 0.5-0.7%, and a metal flow rate at 337° C./6.6 kgf of approximately 17.8 g/10 min.

In some implementations, the temples may be formed from a thin layer (e.g., less than 1.5 mm) of polyetherimide which allows the temples to deform or bend in multiple directions at substantially the same time without breaking or becoming permanently misshapen. For example, the temples of the glasses frame may bend or deform at multiple locations based at least in part on the configuration of and pressure applied by the headgear being placed over the temples. In some cases, the templates may be configured to deform in a manner to maintain a predetermined lens angle, lens position, frame position, and/or distance from an eye of the user, as well as to allow the glasses frames to return to their original shape after the headgear is removed.

Further, the flexibility and resilience of the temples result in frames that are difficult to break and capable of withstand large forces on impacts such as experienced in result of dropping. In other examples, the flexibility of the temples may be useful for situations, such as during a child's play time, sports, after-school activities, recess, construction jobs, among others.

In other cases, the temples may be configured to grip or apply uniform pressure to the side of the user's head in lieu of using the ears as a resting or anchor point. For example, in some cases, the temples may be configured such that the nose pads rest on the user's nose but a gap exists between the temples and the user's ear. For example, the rim or front of the frames may be configured at an angle, such as a 7° to 9° inward tilt towards the user's face, to allow the frames to rest on the user's nose in a manner such that the temples fail to rest on the user's ears.

By configuring the temples, nose pads, and frame such that the temples fail to contact the user's ear the overall comfort of wearing the glasses is improved. Further when wearing the glasses in conjunction with a hat, helmet or headset, the gap between the temple and ear's provides room for the ear to be compressed without proving an uncomfortable obstacle or pressure point. In some cases, the temples may be configured to apply a uniform pressure along the side of the user's head in lieu of the using the user's ear as a support mechanism. In these cases, the temples may be configured with a more inward arcing shape than that of conventional glasses. For example, the distance between the end of each of the left and right temple may be less than approximately 94 mm, less than approximately 93 mm, or less than approximately 87 mm in adult sized glasses. Conventional glasses typically include a gap in adult glasses of greater than 100 mm. Thus, the reduction in the gap between the temples (e.g., the space or opening for receiving the head of the user) together with the resilience of the polyetherimide temples.

FIG. 1 illustrates a front view and a side view of an example set of glasses frames 100 according to some implementations. For example, the frames 100 may include temples 102, lenses 104, nose pads 106, bridge 108, and rim 110. In some cases, the temples 102 may be coupled to the rim 110 via one or more hinges 112 to allow the temples 110 to fold inward when the frames 100 are not in use.

In the illustrated example, the temples 102 are configured to be thin such that the temples 102 may be comfortable when a user wears the frames 100 in conjunction with headbands, over-the-head headphones, earmuffs, headsets, helmets, goggles, or other headgear. For example, the temples 102 may formed from a thin layer of polyetherimide. For instance, the temples 102 may be less than approximately 1.5 mm and/or less than approximately 1.0 mm in width. The thinness and resilience of the temples 102 allow the frames 100 to deform under pressure exerted from over-the-head headphones, earmuffs, headsets, helmets, goggles, and/or other headgear to prevent the temples from digging uncomfortably into the wearer's ears or skin, reducing a likelihood that the wearer may experience discomfort, headaches, or skin irritation. The thinness of the temples 102 also allow the over-the-head headphones, the earmuffs, the headsets, the helmets, the goggles, and/or other headgear to fit properly, which in turn allows the headgear to operate as intended (e.g., the pilot may hear the tower via a speaker within the compression headsets). In other examples, motorcycle helmets may properly and comfortably fit the wearer when used in conjunction with the frames 100, thereby improving safety of the wearer.

Components of the frames 100 are also molded from materials that may include nickel, titanium, beta titanium, plastics and polymers such as polyetherimide, homopolyamide nylons, carbon (such as carbon nanotubes), and/or combinations thereof to allow the frames 100 to flex or bend at greater than 180 degree angles and return to the original shape. In one example, nose pads 106, bridge 108, and rim 110 may be made of beta titanium while the temples 102 may be made of polyetherimide. In some cases, the density of the temples 102 may be 1.27 grams per cubic centromeres. In other cases, the density of the temples 102 may be less than 1.5 grams per cubic centromeres.

In some embodiments where the balance of the frames 100 is a wearer concern, the ends of the temples 102 may be weighted, for example, with a high-density plastic. Thus, the temples 102 may also include a weighted portion 114. For instance, since the temples 102 are formed from a lightweight material molded at less than 1.5 mm thickness and the rim 110 may be formed from a heavier metal, such as titanium, the frames 100 may in some cases fall off of the wearer's face. In these cases, a weight may be applied at the end of each temple 102 opposite the rim 110. The weight 114 may be selected based on a weight of the rim 110 plus the weight of the lenses 104. The weight 114 may also be positioned such that when the wearer dons a helmet or headgear, the weight 114 is located far enough back that the weight 114 does not apply additional pressure to the wearer's ears or head.

In some implementations, the temples may also be configured to grip or hold the user's head opposed to resting on the user's ears. For example, the ends of each of the temples 102(A) and 102(B) may be closer in distance 116 to each other than temples of conventional glasses. For instance, the distance 116, indicated by line 118, may be less than approximately 94 mm, less than approximately 93 mm, less than approximately 87 mm, or less than approximately 81 mm for adult sized glasses. The relative closeness of the temples 102(A) and 102(B) combined with the thinness, width, and resilience of the polyetherimide temples 102, allows the temples 102 to grip the head of the user in a manner that is substantially unnoticeable by the user and, thus, comfortable. Additionally, by configuring the temples 102 to grip the head of the user, the temples 102 together with the nose pads 106 may be configured such that the temples 102 do not rest on the ears of the user as in conventional eye wear. For example, the nose pads 106 may act as an anchor that supports the rim 110 and the lenses 104, while the temples 102 act to resist movement of the frames 100 (e.g., falling off the head of the user) by applying an inward force on the head rather than the downward and forward force applied by conventional eye wear on the ears of the user.

In addition to the relative closeness of the temples 102(A) and 102(B), the frames 100 described herein may include a more pounced arc than that of a conventional frame to further increase the grip of the temples 102 on the head of the user. For example, the temples 102 of the frames 100 may at point 120(A) and 120(B) be between approximately 134 mm to approximately 138 mm distance from each other, generally indicated by distance 124. The temples 102(A) and 102(B) may arc inwardly, such that at point 122(A) and 122(B) the temples 102(A) and 102(B) are between approximately 87 mm and approximately 93 mm apart (e.g., the distance 116 is between approximately 87 mm and approximately 93 mm). In other examples, the temples 102 of the frames 100 may at point 120(A) and 120(B) be between approximately 128 mm to approximately 132 mm distance from each other. The temples 102(A) and 102(B) may arc inwardly, such that at point 122(A) and 122(B) the temples 102(A) and 102(B) are between approximately 82 mm and approximately 88 mm apart (e.g., the distance 116 is between approximately 82 mm and approximately 88 mm). In yet another example, the temples 102 of the frames 100 may at point 120(A) and 120(B) be between approximately 135 mm to approximately 139 mm distance from each other. The temples 102(A) and 102(B) may arc inwardly, such that at point 122(A) and 122(B) the temples 102(A) and 102(B) are between approximately 88 mm and approximately 94 mm apart (e.g., the distance 116 is between approximately 88 mm and approximately 94 mm).

In some specific examples, the arc of the temples 102 may cause the frame 100 to be wider along the rim 110 than conventional glasses while having a narrow distance 116 between the points point 122(A) and 122(B). For example, the rim 110 may be greater than 140 mm wide (e.g., the distance between points 120(A) and 120(B)), while the distance between the points 122(A) and 122(B) may be less than 94 mm or less than 87 mm. In one specific example, the rim 110 may be 150 mm wide and the distance between 122(A) and 122(B) may be approximately 91 mm.

In some implementations, the difference in length between the distance between points 120(A) and 120(B) and the distance between points 122(A) and 122(B) may be measured as a percentage. For example, the distance between points 122(A) and 122(B) may be between 58% and 69% of the distance between points 120(A) and 120(B) (e.g., the distance 116 is between 58% and 69% of the distance 124). In one specific example, the distance 116 may be 61.5% the length of the distance 124. In another specific example, the distance 116 may be 62.5% the length of the distance 124.

In some examples, the distance 116 between points 122(A) and 122(B) and the distance 124 between points 120(A) and 120(B) may be a ratio. For example, the distance 116 may be 6/10 the distance 124. In another example, the distance 116 my be between 5/10 and 7/10 of the length of the distance 124.

In some cases, the temples 102 of the adult sized frames 100 may include an arc that varies from 0° up to a maximum of 25°. For example, at the points 122(A) and 122(B) the arc may be at 25° but at the points 120(A) and 120(B) the arc may be 0°. In another example, the arc of the temples 102 may vary from 0° to a maximum of 20°. In other examples, the initial angle of the temples 102 compared with the rim 110 may be 5° from the perpendicular. For instance, if the temples 102 are attached to the rim 110, the temples 102 would have an initial slope of 5° from a 90° or perpendicular angle with respect to the rim 110. In other examples, the initial angle of the temples 102 compared with the rim 110 may be 2° from the perpendicular. In other examples, the initial angle of the temples 102 compared with the rim 110 may be in the range of 1° to 15° from the perpendicular. In still other examples, the initial angle of the temples 102 compared with the rim 110 may be in the range of 2° to 6° from the perpendicular.

In some cases, the initial angle of the temples 102 with respect to the rim 110 may substantially uniform for the first 70% of the length of the temples 102 and may increase to a maximum arc of 25° at points 122(A) and 122(B) over the remaining 30% of the length of the temples 102. In another example, the initial angle of the temples 102 with respect to the rim 110 may substantially uniform for the first 72% of the length of the temples 102 and may increase to a maximum arc of 25° at points 122(A) and 122(B) over the remaining 28% of the length of the temples 102. In another example, the initial angle of the temples 102 with respect to the rim 110 may substantially uniform for the first 65% to 75% of the length of the temples 102 and may increase to a maximum arc of 25° at points 122(A) and 122(B) over the remainder of the length of the temples 102.

In some examples, the adult sized frames 100 may also be of relative light weight when compared to conventional eye wear. For instance, the frames 100, including the temples 102, the lenses 104, the nose pads 106, the bridge 108, and the rim 110 may be between approximately 0.4 ounces and approximately 0.9 ounces. In other cases, the adult frames 100 may be between approximately 0.6 ounces and approximately 0.8 ounces. In one particular instance, the weight of the adult sized frames 100 may be 0.7 ounces or 0.8 ounces.

Figure 2:
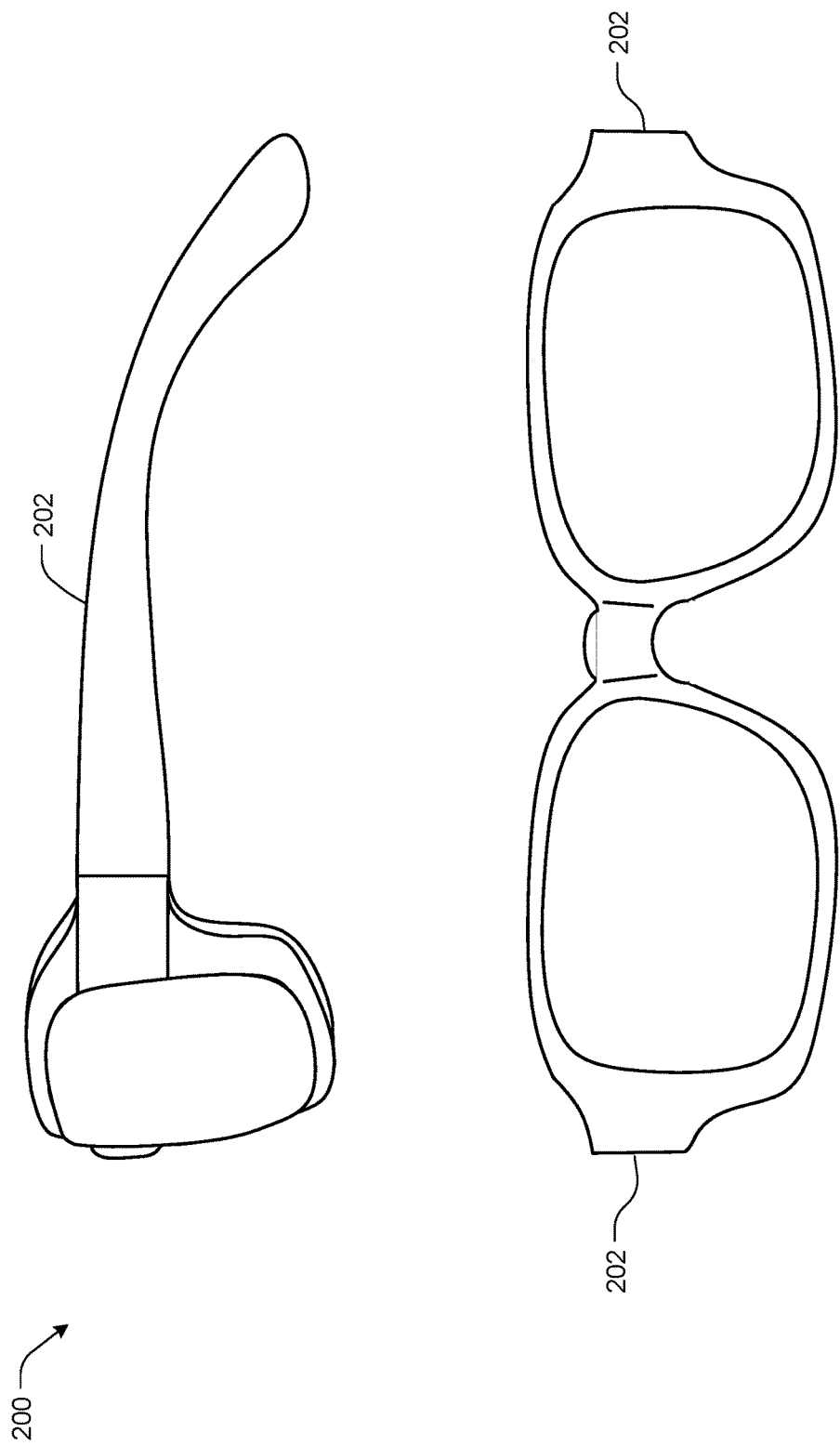
FIG. 2 illustrates a side view and a front view of another example set of glasses frames according to some implementations.

FIG. 2 illustrates a side view and a front view of another example set of glasses frames according to some implementations. Similar to the glasses frames 100 of FIG. 1, the frames 200 include templates 202 that are thin and flexible. However, the frames 200 may be of a different style then the frames 100 and formed from a different material. For example, the frames 200 may be formed from polyetherimide, polyether, polyimide, or other flexible polymer that is less than 1.5 mm or less than 1.0 mm. For example, the temples 202 may be configured to deform at one or more locations along the length of the temples 202 without breaking or permanently deforming.

Figure 3:
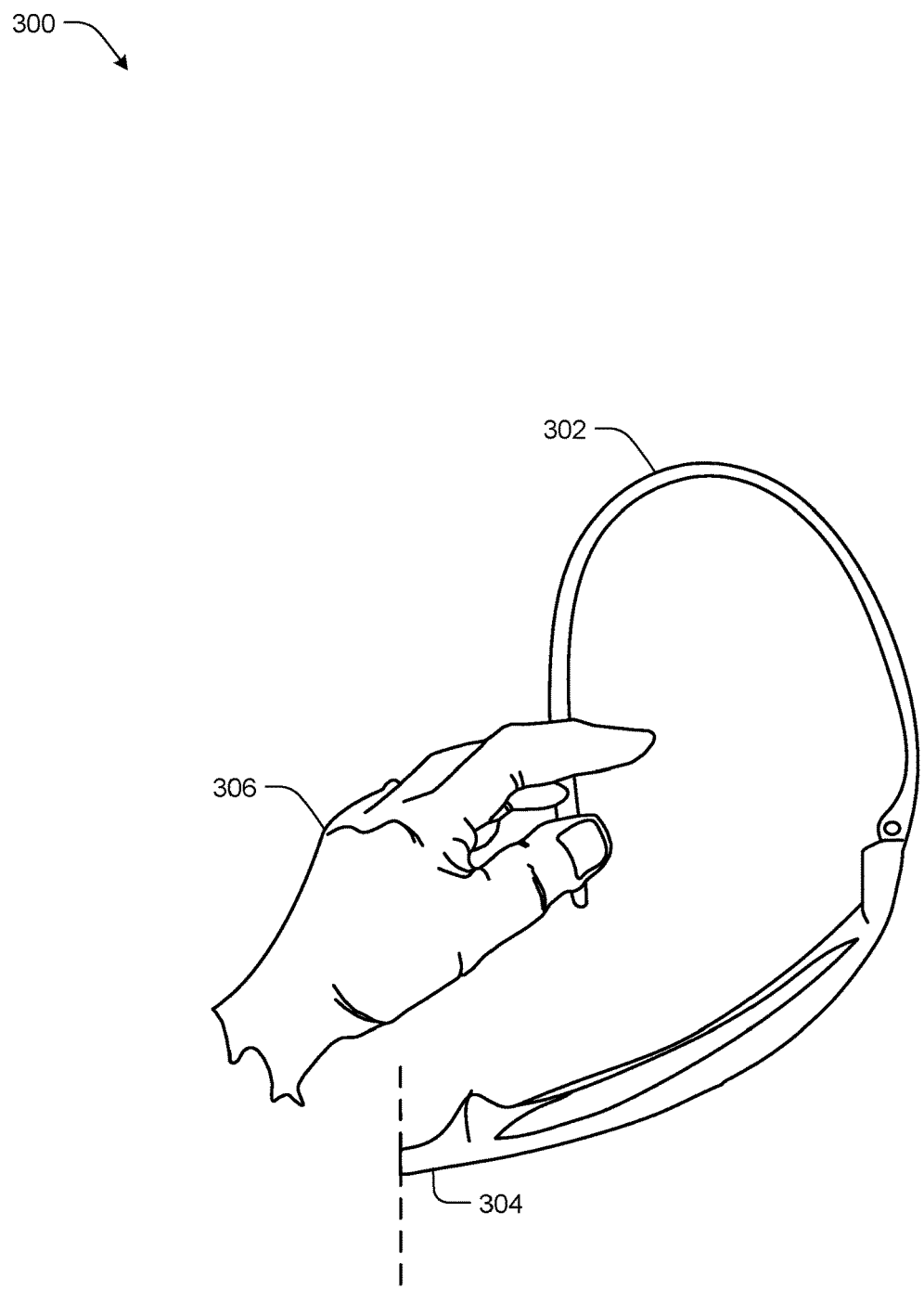
FIG. 3 illustrates a top view an example set of glasses frames according to some implementations.

FIG. 3 illustrates a top view an example set of glasses frames 300 according to some implementations. In the illustrated example, a temple 302 of the frame 300 is deformed in an inward direction toward the bridge 304 of the frames 300. The temple 302 may be formed from a material (e.g., beta titanium or polyetherimide) at a thickness of less than 1.5 mm. The combination of the material and the thickness of the temple 302 may allow the temple 302 to bend approximately 180 degrees without permanently deforming. Thus, the temple 302 may return to the original shape when the pressure applied by the hand 306 is removed.

Figure 4:
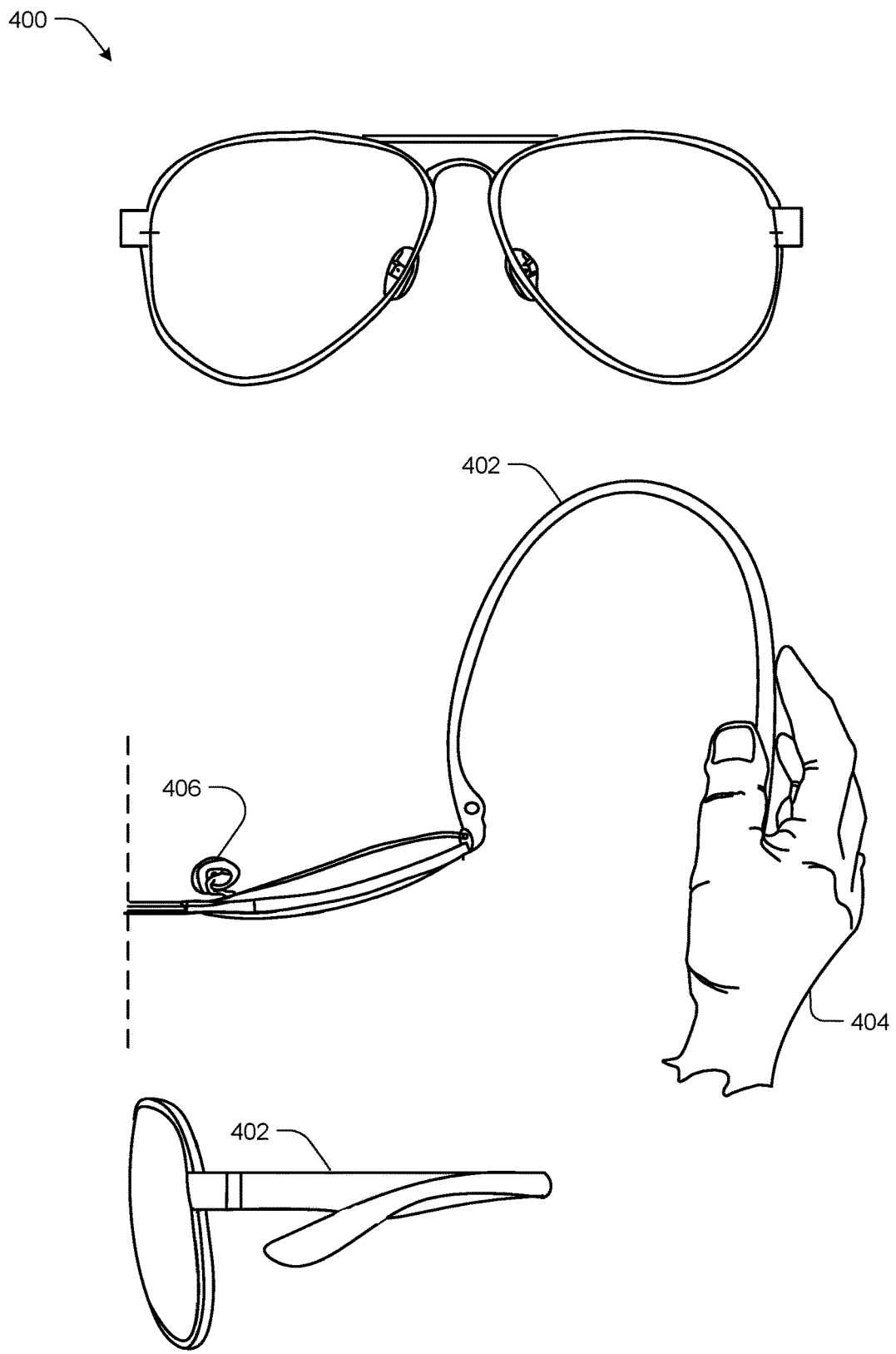
FIG. 4 illustrates a side view and a front view of an example set of glasses frames according to some implementations.

FIG. 4 illustrates a side view and a front view of an example set of glasses frames 400 according to some implementations. In the illustrated example, a temple 402 of the frame 400 is experiencing a pressure from a hand 404 of the user in an outward direction or away from a nose pad 406 of the frames 400. Similar to the frames 300 of FIG. 3 above, the temples 402 are formed from a material (e.g., beta titanium or polyetherimide) at a thickness of less than 1.5 mm to allow the temple 402 to deform or bend at a 180 degree angle without permanently deforming. The combination of the material and thinness of the temple 402 also allows the temples 402 to fit comfortably and unobtrusively underneath headgear such as helmets, headsets, goggles, and over-the-head headphones. For example, construction workers often work in outdoor environment while wearing protective helmets. The protective helmet often leaves little space between the head of the user and the helmet. When traditional sunglass frames are worn, the helmet applies an inward pressure on the temples, which in turn applies an inward pressure from the temples on the head of the user.

Figure 5:
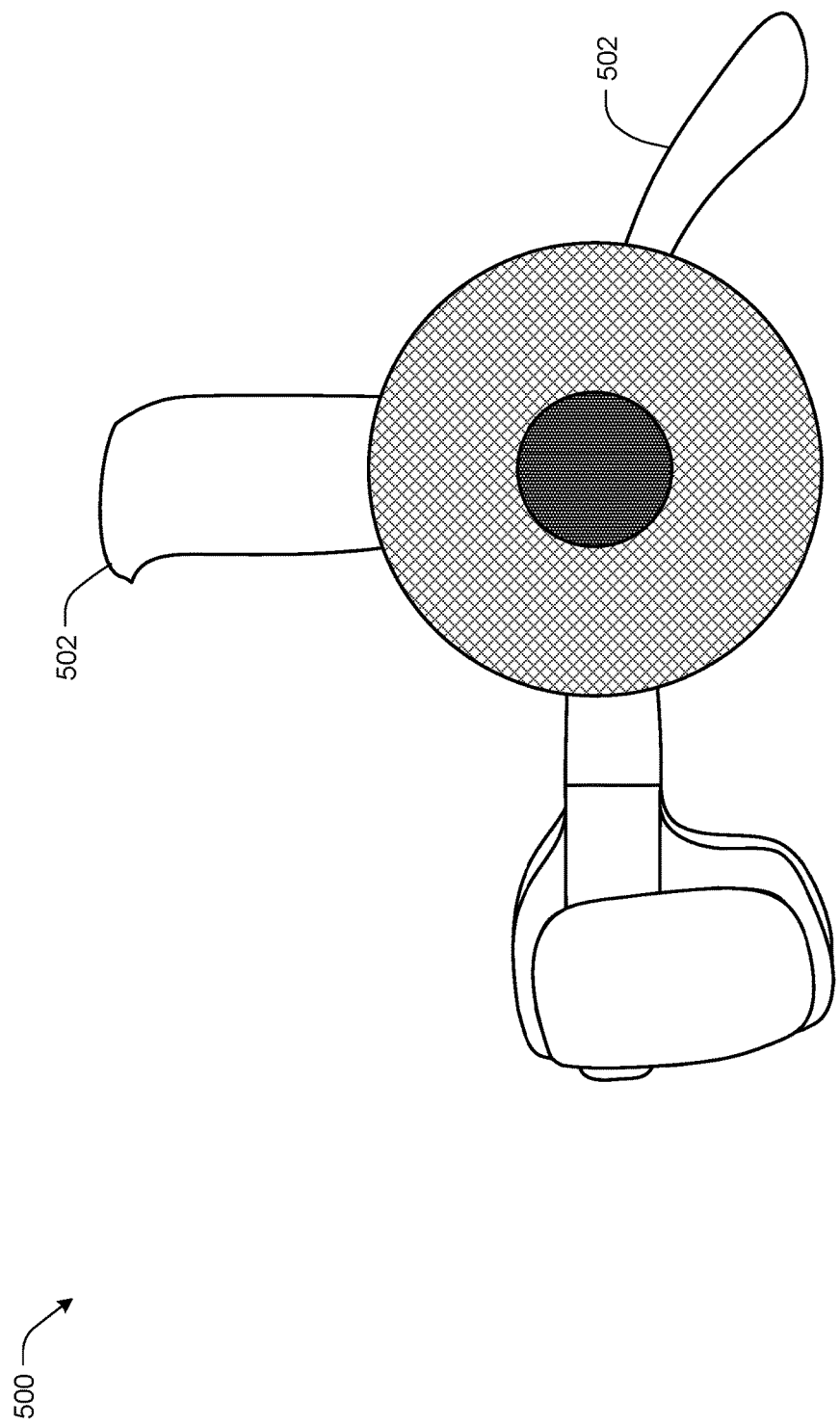
FIG. 5 illustrates a side view of an example set of glasses frames under over-the-head headphones according to some implementations.

FIG. 5 illustrates a side view of an example set of glasses frames 500 under over-the-head headphones 502 according to some implementations. The temple 504 of the glasses frames 500 is configured to deform in multiple locations as discussed below with respect to FIG. 6. The temple 504 is also less than approximately 1.0 mm thick. The combination of the deformability and the thickness of the temple 504 allows the temples 504 to fit comfortably between the over-the-head headphones 502 and the wearer's head. For example, the thinness of the temple 504 minimizes pressure and friction against the wearer's head, thereby reducing the risk of discomfort, skin irritation, and headaches in the wearer.

Figure 6:
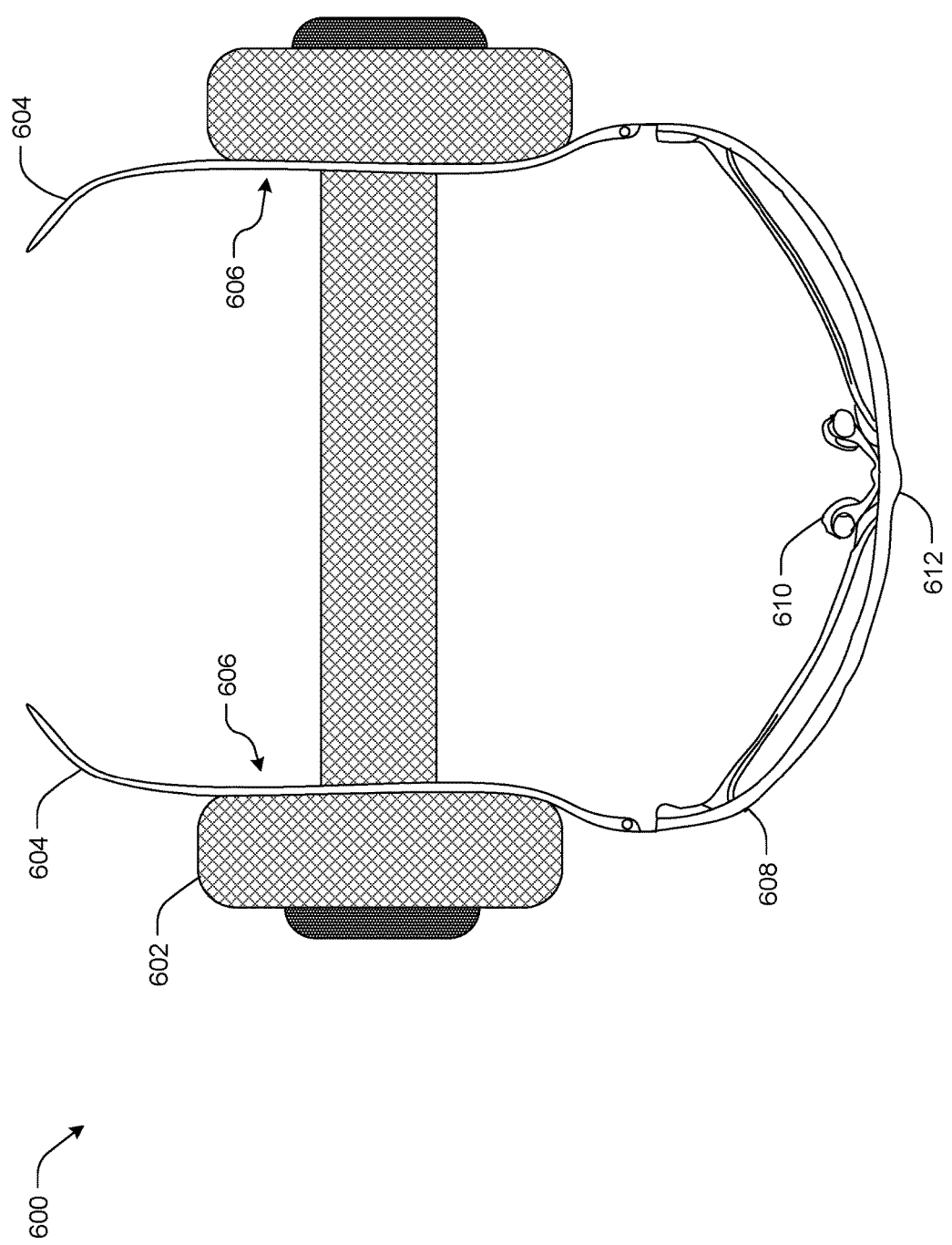
FIG. 6 illustrates a top view of an example set of glasses frames experiencing the effects of pressure applied by over-the-head headphones.

FIG. 6 illustrates a top view of an example set of glasses frames 600 experiencing the effects of pressure applied by over-the-head headphones 602. For instance, as discussed above the over-the-head headphones 602 may be a compression headset used by pilots to reduce or cancel noise from an environment. Thus, in the illustrated example, each of the temples 604 of the frames 600 are deformed along a length of the temples 604, generally indicated by 606. For instance, the temples 604 may deform or bend in response to the pressure applied by the compression headphones 602. Additionally, it should be understood that the pressure applied to the temples 604 is also applied via the temples 604 to the head of the wearer. However, because the temples 604 are thin, for instance, less than 1.5 mm thick, and flexible to deform based on the shape of the headphones 602, the temples 604 fit comfortably between the head of the wearer and the headphones 602. The deformation of the temples 604 allows the over-the-head headphones 602 to also fit properly over the ears, thereby, allowing the headphones 602 to operate and fit as intended. Additionally, the deformation of the temples 604, reduces any deformation along the rim 608, nose pads 610, or bridge 612 of the frames 600. The reduction in deformation along the rim 608, nose pads 610, or bridge 612 further improves the comfortability of the frame 600 when worn in conjunction with the headphones 602.

Figure 7:
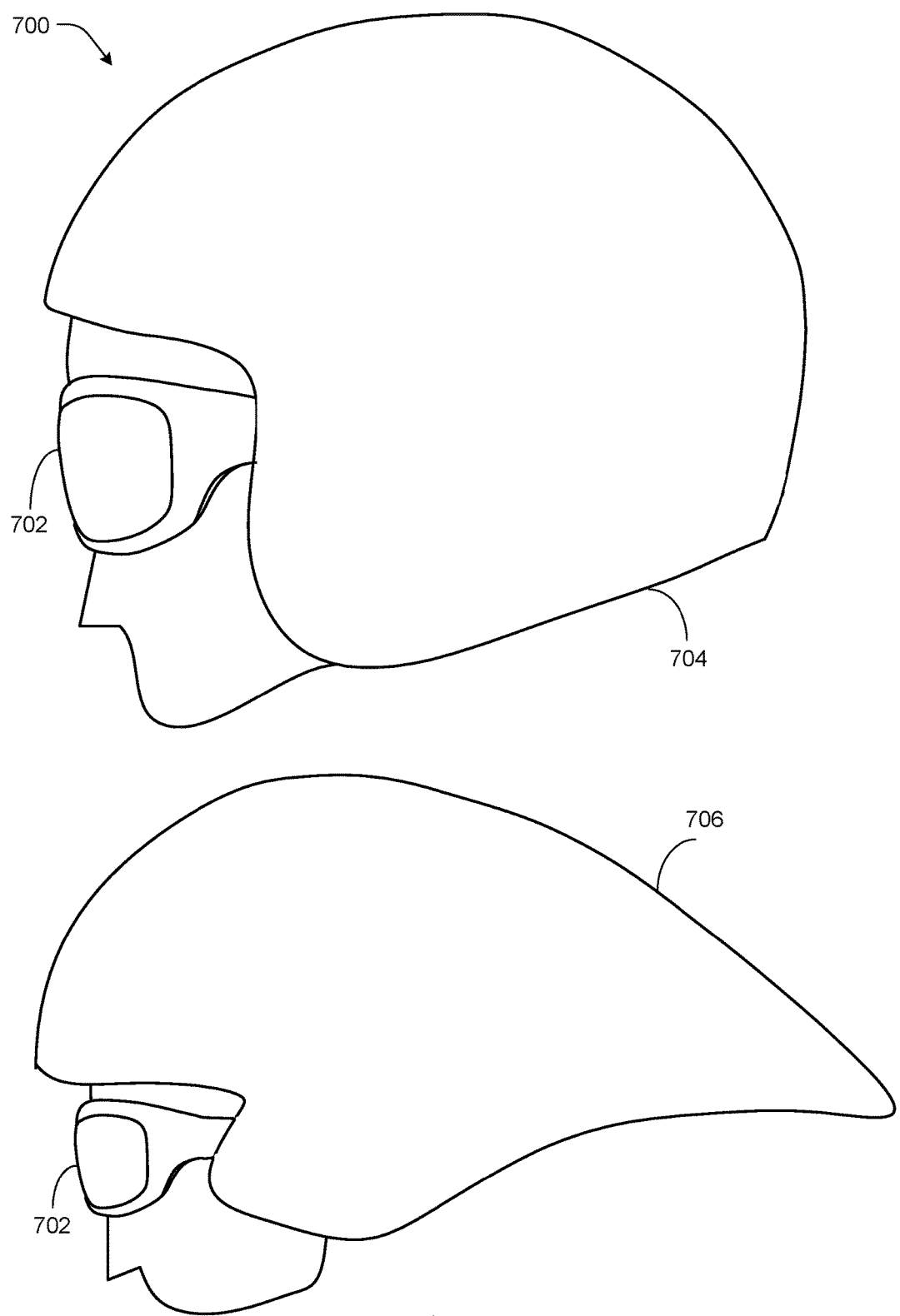
FIG. 7 illustrates a side view of example set of glasses frames under a motorcycle helmet and a bicycle helmet according to some implementations.

FIG. 7 illustrates a side view of an example set of frames 702 under a motorcycle helmet 704 and a bicycle helmet 706 according to some implementations. The frames 702 are deformable and have thin temples, for example, less than approximate 0.5 mm, less than approximately 0.8 mm, less than approximately 1.0 mm or less than approximately 1.5 mm thick. The temples are configured to consume minimal space within the helmets 704 and 706, such that the helmets 704 and 706 fit properly, increasing the wearer's safety and comfort. For example, the temples of the frames 702 may deform in multiple locations and/or directions as discussed below with respect to FIG. 8 to further improve the fit of the helmet 704 or 706. For instance, the thinness of the temples minimizes pressure and friction against the wearer's head, thereby reducing the risk of discomfort, skin irritation, and headaches in the wearer. Similarly, the deformability allows the frames 702 to deform inside the helmets 704 and 706 while retaining the lenses in a desired position, orientation, and angle with respect to the eyes, reducing the likelihood of strain, improving vision, and reducing discomfort with respect to the nose of the wearer.

Figure 8:
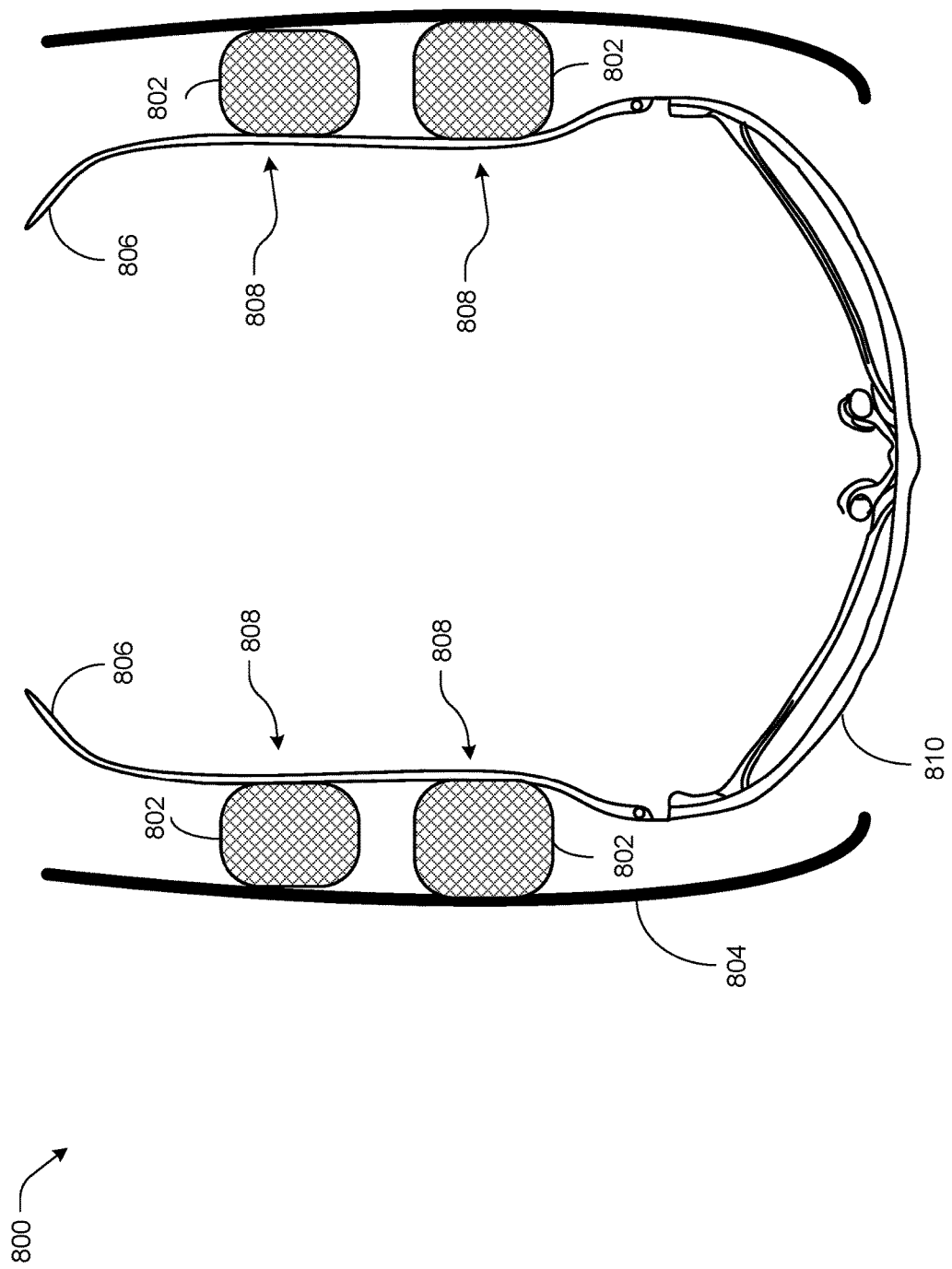
FIG. 8 illustrates a top view of an example set of glasses frames deformed by padding under a helmet according to some implementations.

FIG. 8 illustrates a top view of an example set of glasses frames 800 deformed by padding 802 under a helmet 804 according to some implementations. The frames 800 are deformable and have thin temples 806, as discussed above. The padding 802 exerts pressure on the frames 800 at locations 808, which causes the frames 800 to deform at each of the locations, generally indicated by 808. The combination of deformability and the thickness of the temples 806 allows the temples of frames 800 to fit comfortably between the helmet 804 and the wearer's head. For example, the thinness of the temples 806 results in only a small percentage of increased pressure on the wear's head. For instance, the increase in pressure may be less than 5% or less than 1% that of the original pressure or force applied by a helmet 804. In some cases, the width or height of the temples 806 may be utilized to distribute the pressure or force along the full length of the temples 806 or at least a portion of the temple 806. Thus, in some implementations, the height of the temples 806 may be greater than 0.5 inches but less than 1.0 inches. In other implementations, the height of the temples 806 may be greater than 0.25 inches but less than 1.5 inches. In still other implementations, the height of the temples 806 may be greater than 5 mm but less than 20 mm or between 5 mm and 15 mm. In one specific implementation, the height of the temples 806 may be approximately 8 mm. In another specific implementation, the height of the temples 806 may vary from 5 mm to 15 mm along the length of the each of the temples 806. Additionally, in some cases, the temples 806 may be substantially flat to further assist in the distribution of pressure along the length of the temples 806. Thus, the combination of thinness, height, and shape of the temples 806 may provide a more comfortable fit and reduce the overall pressure experienced at any particular point along the wear's head.

In some specific examples, the thickness of temples 806 may be a ratio of the height of the temples, expressed as thickness/height. For example, the ration of thickness to height may be ⅕ (e.g., the thickness of the temples 806 may be 1.0 mm and the height of the temples 806 may be 5.0 mm). In some instances, the ration may be minimum such that if the thickness of the temples is 1.0 mm than the height is at least 5.0 mm. In other cases the ratio may be a range such that the thickness of the temples 806 may be 1.0 mm and the height of the temples 806 may be between 5.0 mm and 15 mm.

Figure 9:
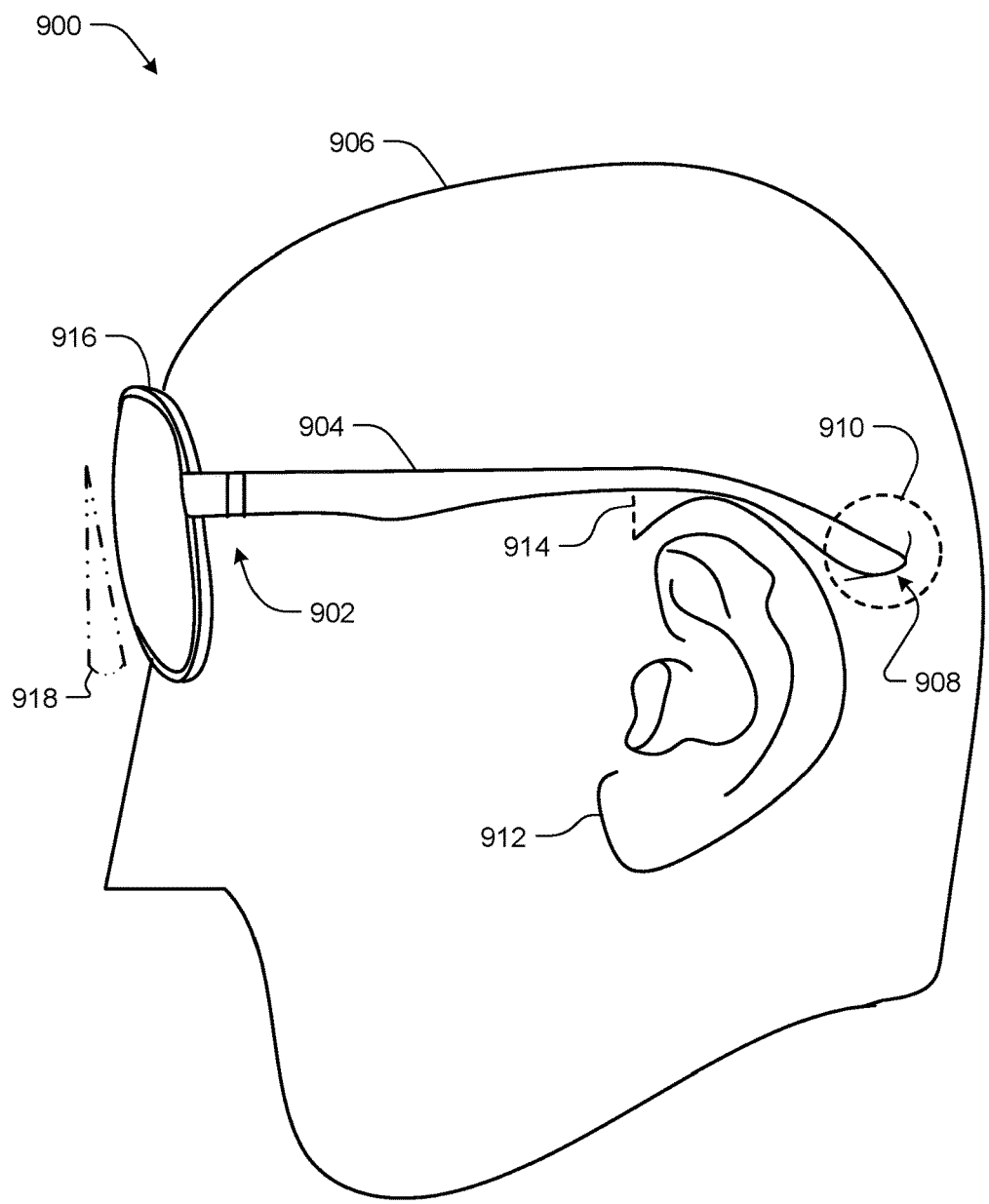
FIG. 9 illustrates a side view of an example set of glasses frames being worn by a user according to some implementations.

FIG. 9 illustrates a side view of an example set of glasses frames 902 being worn by a user 900 according to some implementations. In the illustrated example, a left temple 904 of the frames 902 is positioned correctly on the head 906 of the user 900. As discussed above, the right temple (not shown) and the left temple 904 are configured to apply an inward pressure on the head 906 due to the relative closeness of the temples 904 to each other. For instance, since the right and left temples 904 are formed from a thin (less than approximately 1.5 mm) layer of polyetherimide and the distance between an end 908 of the left temple 904 and an end of the right temple are less than approximately 94 mm, less than approximately 93 mm, or less than approximately 87 mm for adult sized glasses. Conventional glasses typically include a gap in adult glasses of greater than 100 mm. Thus, the reduction in the gap between the temples (e.g., the space or opening for receiving the head of the user).

In some cases, the nose pad and rim or front 916 of the frames 900 may include an inward tilt 918 that assists in causing the right and left temple 904 to rest at a position that does not contact the ear 912, as shown. For example, the rim 916 may include a 7° to 9° degree tilt towards the user 900. In some cases, the inward pressure may be applied along both the length of the right and the left temple 904. In the illustrated example, the pressure applied by the right and left temple 904 may gradually along the temple 904, such that the maximum pressure is applied at a location 910, as shown. Further, as illustrated, the pressure at location 910 and along the length of the left temple 904 as well as similar situation with the right temple (not shown), allow the frames 902 to rest on the head 906 without contacting the ear 912 of the user 900. For instance, the left temple 904 is shown with a space or gap 914. By configuring the left temple 904 to sit above the ear 912 of the user 900, the overall comfort of the user 900 is improved as the weight of the frames 902 is not felt along the ear 912 of the user 900. The gap 914 is particularly useful when wearing glasses for extended periods of time, as is often the case with prescription eye wear.

Figure 10:
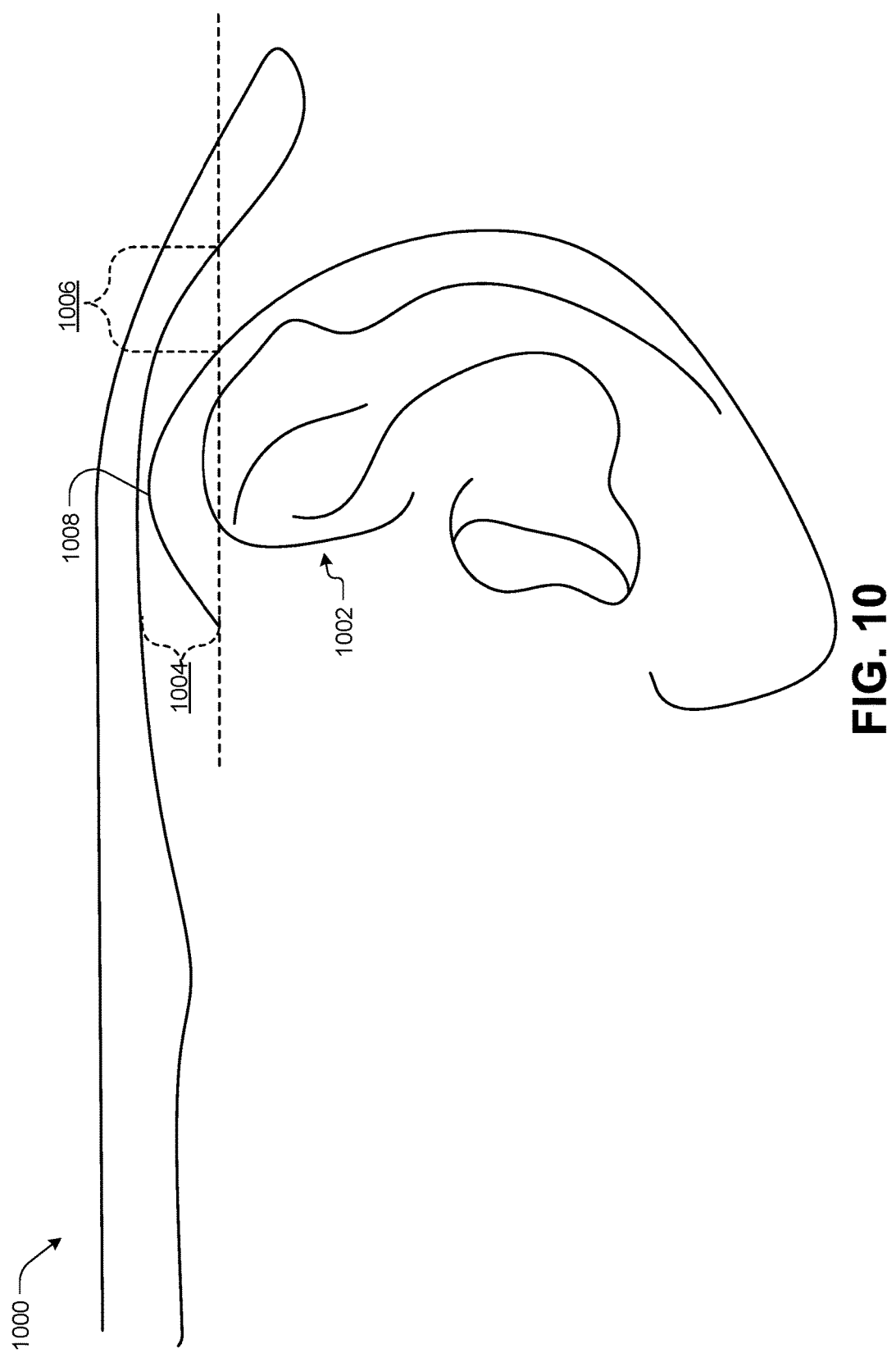
FIG. 10 illustrates a side view of an example showing a temple in relation to an ear of a user according to some implementations.

FIG. 10 illustrates a side view of an example showing a temple 1000 in relation to an ear 1002 of a user according to some implementations. As discussed above, the temple 1000 is resting on the head of the user at a position that does not contact the ear 1002. Thus, as illustrated, gaps 1004 and 1006 exist between the ear 1002 and the temple 1000. While the size of the gaps 1004 and 1006 may vary depending on head size and nose position of the user, the gaps 1004 and 1006 exist when the frames discussed herein are worn correctly. In some cases, the temple 1000 may be below an apex, generally indicated by 1008, of the ear 1002, however, the temple 1000 may still include the gaps 1004 and 1006 such that the temple 1000 does not rest on the ear 1002.

In cases, in which the temple 1000 rests on the head of the user below the apex 1008 of the ear 1002, the relative thinness, less than 1.5 mm or less than 1.0 mm, of the polyetherimide temple 1000 together with the height of the temple 1000, greater than approximately 7 mm, allows the ear 1002 to compress against the temple 1000 in a manner that reduces pressure and discomfort caused by temples of conventional eye wear.

Figure 11:
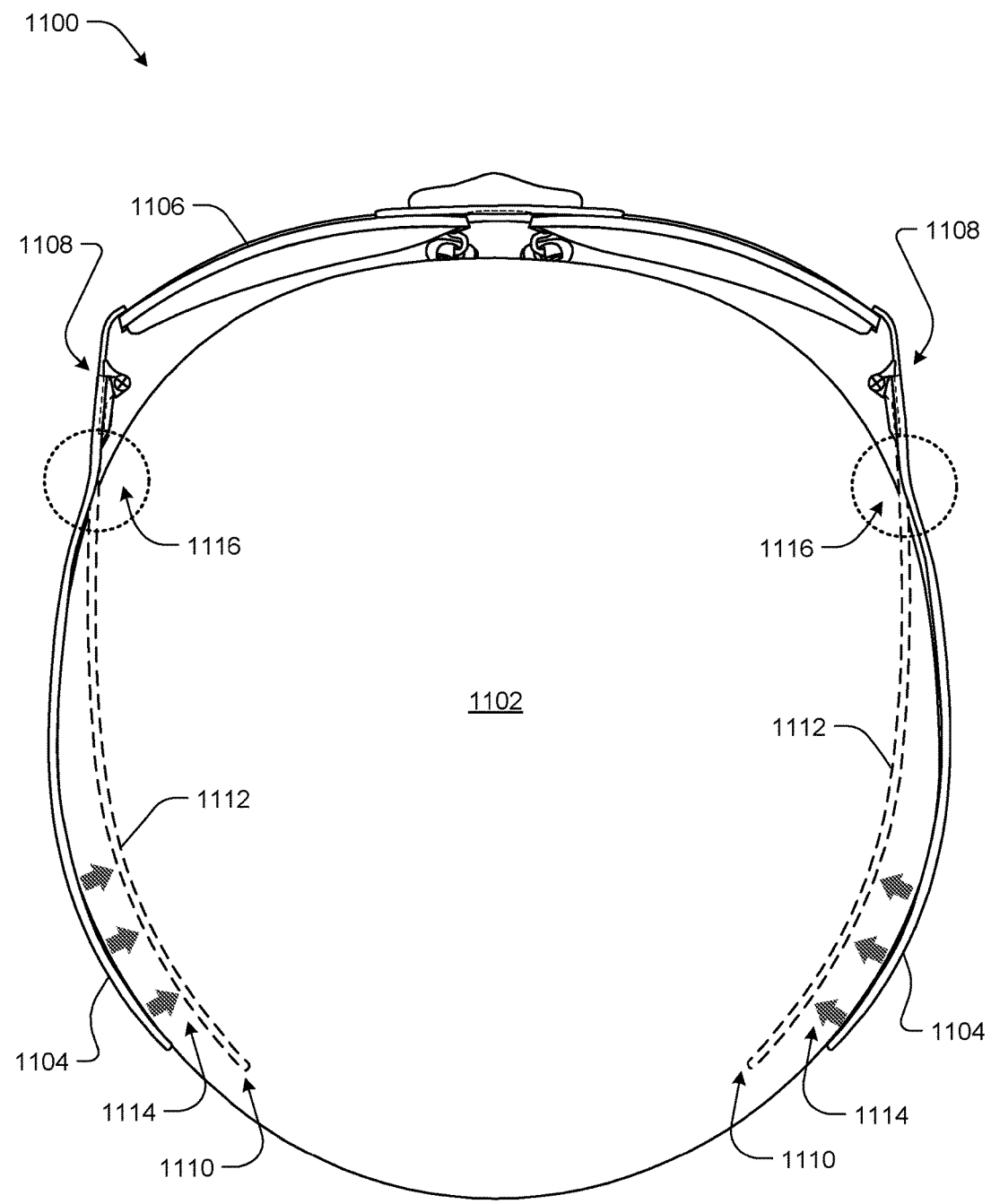
FIG. 11 illustrates a top view of an example set of glasses frames being worn by a user according to some implementations.

FIG. 11 illustrates a top view of an example set of glasses frames 1100 being worn by a user 1102 according to some implementations. In the illustrated example, the temples 1104 of the frames 1100 are deformed around the head of the user 1100. However, the temples 1104 are in the correct position relative to the rim 1106 of the frames 1100 at the points 1108 at which the temples 1104 couple to the rim 1106. As discussed above, due to the relative thinness, less than 1.5 mm, less than 1.0 mm, or less than 0.8 mm, the polyetherimide temples 1104 are able to deform at multiple positions without deforming the rim 1106. Since the rim 1106 remains in a constant desired arrangement, the viewing experience of the user 1102 is uncompromised by the deforming of the temples 1104. In this manner, the relative distance between the ends 1110 of the temples 1104 may be reduced to less than approximately 94 mm, less than approximately 93 mm, or less than approximately 87 mm in adult sized glasses when not in use without affecting the viewing experience.

In the illustrated example, the temples 1104 are experiencing deformation along the length of the temple 1104. For example, the original position of the temples 1104 are shown by dotted outline 1114 and the current, in use position, is shown by temples 1104. Thus, an inward pressure is applied to the side of the head of the user 1002, generally indicated by arrows 1114. The inward pressure allows the frame 1100 to remain the user 1102 without contacting the ear of the user 1102 as in conventional eye wear. Further, since the pressure 1114 is dispersed over the length of the temples 1104, the pressure 1114 is minor and substantially undetectable by the user.

The deformation of the temples 1104 caused by use may be more pronounced at particular locations than at others. For example, the temples 1104 may experience increased deformation at locations 1116. However, since the temples are formed from the thin layer of polyetherimide, the temples 1104 may return to the original position once removed from the user 1102. Further, the deformation at locations 1116 allows the temples 1104 to align correctly with the rim 1106, thereby reducing the pressure, strain, and deformation experienced along the rim 1106 of the glasses and improving the overall wearing experience.

Figure 12:
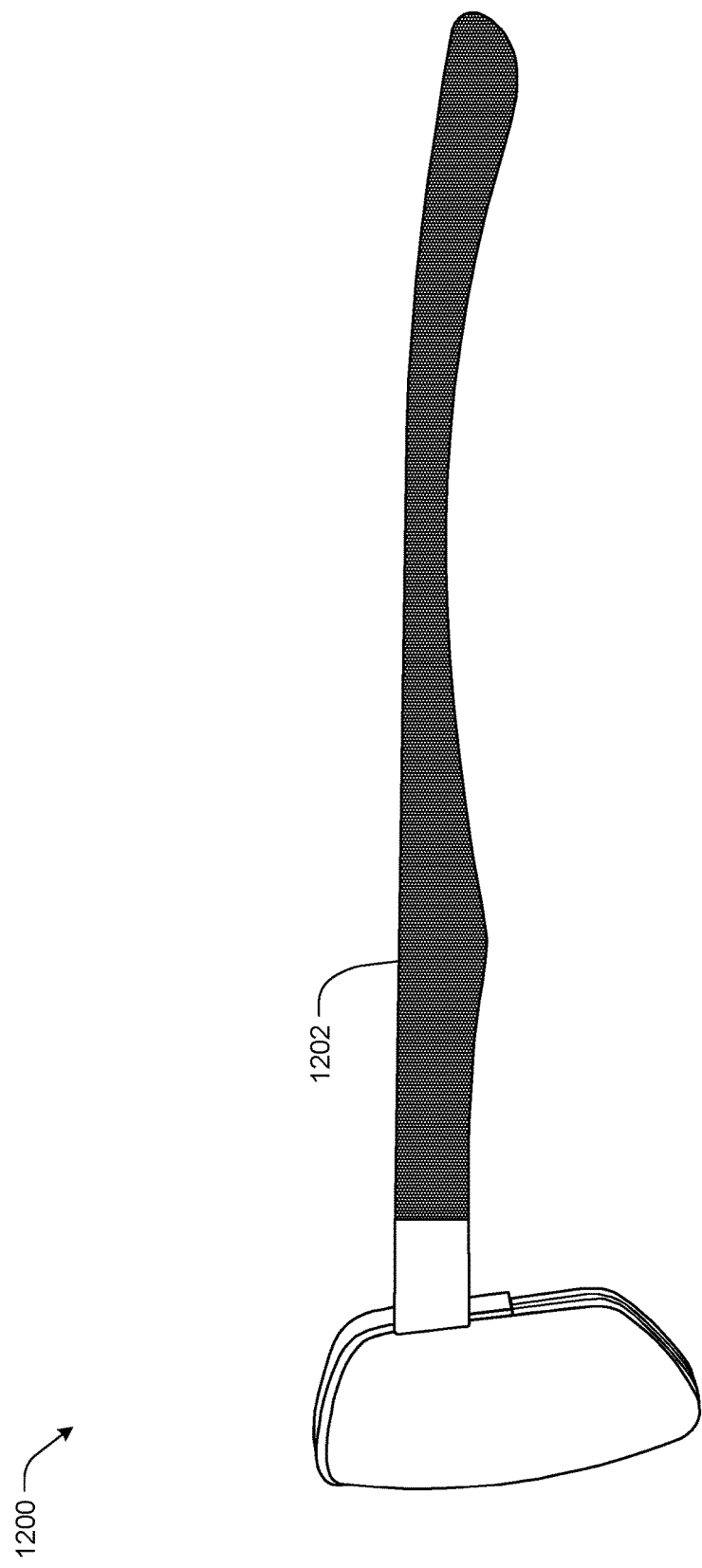
FIG. 12 illustrates a side view of an example set of glasses frames according to some implementations.

FIG. 12 illustrates a side view of an example set of glasses frames 1200 according to some implementations. In the current example, the temples 1202 of the frames 1200 have been configured to have a rough exterior or coating that may be utilized to provide additional grip to the head of a user when worn. For example, since the frames 1200 are configured to rest at a position distant from the ears of the user, the temples 1202 may be textured to provide additional grip. In some cases, the texture may be applied via the molding process. In other examples, the texture may be added via a coating, such as a spray coating, or other post molding process.

Although the subject matter has been described in language specific to structural features, it is to be understood that the subject matter defined in the appended claims is not necessarily limited to the specific features described. Rather, the specific features are disclosed as illustrative forms of implementing the claims.

What is claimed is:

1. A frame for adult glasses comprising:
   rims coupled to a first lens and a second lens;
   a first temple, the first temple less than approximately 1.5 millimeters (mm) thick and having a first original shape, the first temple configured to deform in response to receiving a first inward pressure at a first location on the first temple and to return to the first original shape in response to a removal of the first inward pressure; and
   a second temple, the second temple less than approximately 1.5 mm thick and having a second original shape, the second temple configured to deform in response to receiving a second inward pressure at a second location on the second temple and to return to the second original shape in response to a removal of the second inward pressure;
   a first hinge to couple the first temple to the rims; and
   a second hinge to couple the second temple to the rims.

2. The apparatus of claim 1, wherein the first temple is configured to deform in response to receiving a third inward pressure at a third location on the first temple at substantially the same time as the first inward pressure and to return to the first original shape in response to a removal of the third inward pressure.

3. The apparatus of claim 2, wherein the third inward pressure at the third location on the first temple is in a different direction than the first inward pressure at the first location.

4. The apparatus of claim 1, wherein the second temple is configured to deform in response to receiving a fourth inward pressure at a fourth location on the second temple at substantially the same time as the second inward pressure and to return to the second original shape in response to a removal of the fourth inward pressure.

5. The apparatus of claim 4, wherein the fourth inward pressure at the fourth location on the first temple is in a different direction than the second inward pressure at the second location.

6. The apparatus of claim 1, wherein the first temple is configured to deform to at least 180 degrees from the first original shape.

7. The apparatus of claim 1, wherein the second temple is configured to deform by at least 270 degrees from the second original shape.

8. The apparatus of claim 1, wherein the rims are configured to retain an original rims shape during application of the first inward pressure and the second inward pressure.

9. A set of adult glasses, comprising:
a rim for receiving lenses and having a first end and a second end, the rim formed from a first material and having a length of greater than 135 millimeters (mm);
a first temple having a first end and a second end, the first end of the first temple coupled to the first end of the rim, the first temple being substantially flat and formed from a second material, the first temple having a thickness of less than 1.6 mm and a height of greater than 6.0 mm, the second material different than the first material;
a second temple having a first end and a second end, the first end of the second temple coupled to the second end of the rim, the second temple being substantially flat and formed from the second material, the second temple having a thickness of less than 1.6 mm and a height of greater than 6.0 mm, a distance between the second end of the first temple and a second end of the second temple is less than 95 mm.

10. The adult gasses of claim 9, wherein the second material is polyetherimide.

11. The adult gasses of claim 9, wherein the distance between the second end of the first temple and a second end of the second temple is less than 88 mm.

12. The adult gasses of claim 9, wherein the length of the rim is greater than 140 mm.

13. The adult gasses of claim 9, wherein the length of the rim is greater than 150 mm.

14. The adult gasses of claim 9, wherein the first material is at least one of nickel, titanium or beta titanium.

15. The adult gasses of claim 9, wherein the distance between the second end of the first temple and a second end of the second temple is approximately 62.5 percent the length of the rim.

16. The adult gasses of claim 9, wherein the thickness of the first temple is less than 1.06 mm and the thickness of the second temple is less than 1.0 mm.

17. The adult gasses of claim 9, wherein the first temple applies a first pressure on a head of the user when in use and the second temple applies a second pressure on the head of the user when in use, the first pressure opposite the second pressure.

18. A head gear system comprising:
adult glasses, the adult glasses including a frame having:
a rim having a first end and a second end;
a first temple having a first end and a second end, the first end of the first temple coupled to the first end of the rim, the first temple having a thickness of less than 1.6 mm and a height of greater than 6.0 mm;
a second temple having a first end and a second end, the first end of the second temple coupled to the second end of the rim, the second temple having a thickness of less than 1.6 mm and a height of greater than 6.0 mm and wherein a distance between the second end of the first temple and a second end of the second temple is less than 95 mm;
a headset, the headset including a first compression-ear-piece and a second compression-ear-piece, the first compression-ear-piece configured to contact and apply a first pressure against the first temple, the first temple to distribute the pressure along a length of the first temple when in use, the second compression-ear-piece configured to contact and apply a second pressure against the second temple, the second temple to distribute the pressure along a length of the second temple when in use, the second pressure in a direction opposite the first pressure.

19. The head gear system of claim 18, wherein the first temple and the second temple are substantially flat.

20. The head gear system of claim 18, wherein the first temple and the second temple are formed from polyetherimide.

* * * * *